(12) United States Patent
Daniel et al.

(10) Patent No.: US 6,280,891 B2
(45) Date of Patent: *Aug. 28, 2001

(54) MULTI-LAYER ASSEMBLY AND METHOD FOR MARKING ARTICLES AND RESULTING MARKED ARTICLES

(75) Inventors: Francoise Daniel; Hugues Souparis, both of Paris (FR)

(73) Assignee: Hologram Industries S.A. (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,466

(22) Filed: Aug. 4, 1998

Related U.S. Application Data

(63) Continuation-in-part of application No. 08/578,596, filed on Jun. 20, 1996, now abandoned.

(30) Foreign Application Priority Data

| May 4, 1994 | (FR) | 94 05472 |
| May 3, 1995 | (FR) | PCT/FR95/00574 |

(51) Int. Cl.$^7$ ................................................. G06K 19/16
(52) U.S. Cl. .................................. 430/10; 430/1; 430/2; 359/2; 283/88; 283/86; 283/901
(58) Field of Search .......................... 430/1, 2, 10; 359/2; 283/86, 87, 88, 89, 901, 902

(56) References Cited

U.S. PATENT DOCUMENTS

| 3,620,590 | 11/1971 | Barker | 430/1 |
| 4,014,602 | 3/1977 | Ruell | 430/1 |
| 4,119,361 | 10/1978 | Greenaway | 283/7 |
| 4,211,918 | 7/1980 | Nyfeler et al. | 235/454 |
| 4,547,002 | 10/1985 | Colgate, Jr. | 283/86 |
| 4,856,857 | 8/1989 | Takeuchi et al. | 283/86 |
| 5,319,475 | 6/1994 | Kay et al. | 283/86 |
| 5,483,363 | 1/1996 | Holmes et al. | 283/86 |
| 5,856,048 | * 1/1999 | Tahara et al. | 283/88 |

FOREIGN PATENT DOCUMENTS

| 2046711 | 1/1992 | (CA) . |
| 0101939 | 3/1984 | (EP) . |
| 0328086 | 8/1989 | (EP) . |
| 0512925 | 11/1992 | (EP) . |
| 2117133 | 10/1983 | (GB) . |
| 61-238079 | 10/1986 | (JP) | 430/1 |
| 61-272772 | 12/1986 | (JP) | 430/2 |
| 63-143581 | 6/1988 | (JP) | 430/2 |
| 63-287989 | 11/1988 | (JP) | 430/2 |
| 02-13987 | 1/1990 | (JP) | 430/1 |
| 05-11676 | 1/1993 | (JP) | 430/1 |
| 06-40189 | 2/1994 | (JP) | 283/86 |
| WO 9106295 | 5/1991 | (WO) . |
| WO 93/00224 | 1/1993 | (WO) | 283/86 |

* cited by examiner

Primary Examiner—Martin Angebranndt
(74) Attorney, Agent, or Firm—Schnader Harrison Segal & Lewis LLP

(57) ABSTRACT

Methods and adhesive labels useful in marking products or documents by applying these to substrates. A mark such as a barcode, photograph or characters are formed directly on the substrate and the adhesive label is applied over it. The adhesive label includes a concealing film layer which is transparent to a first wavelength outside the visible region, a diffractive optical mark with a transparent reflective layer and an adhesive layer. The first wavelength may be infrared allowing the underlying mark to be read by an IR laser. The adhesive labels are formed as to allow them to be continuously separated from a temporary detachment layer, thereby exposing the adhesive layer, and affixed to the document.

18 Claims, 7 Drawing Sheets

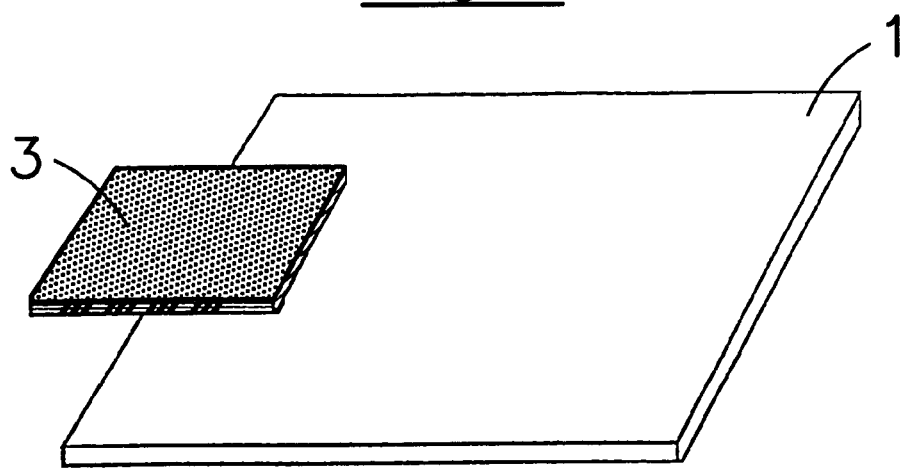
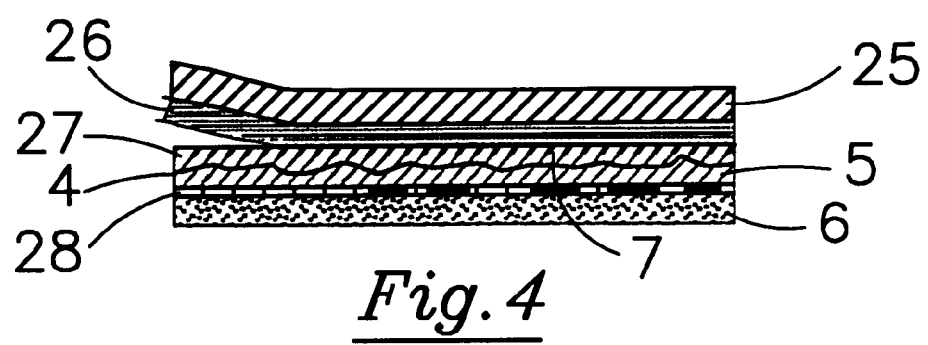

MULTI-LAYER ASSEMBLY AND METHOD FOR MARKING ARTICLES AND RESULTING MARKED ARTICLES

Related Application

This is a continuation-in-part of application Ser. No. 08/578,596, filed on Jun. 20, 1996, now abandoned.

BACKGROUND OF THE INVENTION

1. Field of the Invention

The present invention relates to a procedure for marking documents or products, implementing optical markers such as diffraction gratis, such as for example holograms.

2. Description of the Related Art

The use of holograms for the authentication of documents is known in the state of the art. For example, European patent No. EP-79 100 626 describes an identification card with a hologram and also a manufacturing procedure and a method for recording the hologram on the identification card According to this document in the prior art, the identity card carries readable information and at least one hologram containing the readable information, with the hologram being recorded adjacent to other information on a common recording layer. The other information, which is recorded on the common recording layer, is the readable information Because the implementation of a hologram requires a significant amount of know-how and means that usually are not available to counterfeiters, the security of documents marked in this way is improved.

Another document in the prior art, i.e., Utility Certificate No. FR-92 02 849, discloses a procedure for the marking of bodies (i.e., items) and a device for the identification of bodies marked in accordance with the said procedure, This procedure is characterized essentially by the fact that it consists of implementing, on a substrate, a first hologram of a first object that is readable under white light, and of implementing on the same substrate a second hologram, known as a "Fourier hologram", of a second object. The second object consists of a plurality of point sources of light, which sources are distributed in a random manner, and further involves bonding the said substrate to the body. The invention also relates to a device that allows the identification of bodies when they have been marked in accordance with the procedure.

Another document in the prior art, i.e., French patent No. FR-2 671 032, as issued to the present applicant, relates to the protection of documents against counterfeiting. This protection relates more particularly to a non-counterfeitable layered document that includes a substrate with a marking region that has two surfaces and that carries information which forms a relief pattern on one of its surfaces and hollows or recesses on its other surface, and that also includes a hologram which carries a holographic interference pattern that covers at least part of the surface of the marking region which carries the information forming hollows or recesses. A layer of adhesive ensures the fixation of the hologram to the marking region.

Another document in the prior art, i.e, European patent No. EP-80 104 962, describes an identity card that contains information in holographic form and that includes a substrate which serves as the basic element of the card. A transparent layer is deposited on the substrate and forms a flat optical waveguide, and another layer is placed on the said waveguide and includes at least one hologram containing a piece of information. The said patent also describes a light-coupling device which consists of another hologram that corresponds to a particular predetermined reference light source, and by means of which only one homologous light wave, which corresponds to the particular reference light source, may be injected by coupling into the waveguide.

Overall, these procedures are satisfactory for securing documents that receive information beforehand, in printed form.

However, the information fiction and the authentification function are completely independent and are implemented in two different regions of the document. The result is the possibility of fraud through the modification of the information present on a document that also carries an authentic marked region.

SUMMARY OF THE INVENTION

The purpose of the present invention is to remedy this disadvantage by proposing a more certain (i.e. robust) security marking procedure.

For this purpose, the invention relates first of all to a procedure for marking documents, characterized by the fact that the said procedure consists of applying to a substrate a multi-layer optical complex that consists of identification means such as bar-codes, a photograph, or characters, and that further consists of authentification means, with the two means being superimposed in a way that does not allow them to be separated without destroying the optical complex, and at least without destroying the authentification means.

The authentification means preferably consist of a diffracting optical marker. As used within the context of the present invention, the term "diffracting optical marker" should be understood as referring to diffracting means whose optical behavior, when illuminated by a monochromatic beam of light, is specific. In particular, a diffraction grating or a hologram is considered to constitute a diffracting "optical marker" which, depending on the degree of complexity, will form, in response to monochromatic illumination, a set of luminous points, luminous lines, or, in the case of the hologram, an image.

The identification means are implemented for example, by printing with an ink, and particularly by printing with an ink that is transparent in the visible spectrum and opaque in the infrared range.

The identification means are masked from sight (i.e., not visible), and therefore do not admit of reproduction by means available to the general public, such as photocopiers. Thus the security of the product or of the document is reinforced.

In accordance with a first variant, the identification means are printed on the object to be marked and authenticated. The resulting printed region is then covered with an optical complex formed by a film overlay that allows passage of at least one wavelength band that reads the identification means, and onto which is applied, in an indissociable manner, authentification means formed by a diffracting optical marker.

In accordance with a second variant, an element is prepared that is suitable for being applied indissociably to the object to be marked and authenticatd, for example, in the form of a label, a strip prepared on a spool and glued to the substrate, or a filament inserted into the document. This element consists of an optical complex that includes a lower layer on which the identification means are printed. The resulting printed region is then covered by a film overlay that allows passage of at least one wavelength band that reads the identification means, and by authentification means formed by a diffracting optical marker.

The film overlay is preferably opaque in the visible speck and has a narrow passband in the infrared.

In accordance with a preferred variant, the film overlay covering the printed region has a spectral window the infrared range and the diffraction grating is recorded in such a way as to form at least one diffraction pattern, with the printed image under the film overlay being correlated with the diffraction pattern.

The product marked in accordance with the procedure in accordance with the invention does not allow the information to be changed without altering the means for check the authenticity of the document.

Several optical markers may also be juxtaposed.

The invention also relates to a secured document that includes identification means and authentification means, such as a diffracting optical maker, characterized by the fact that the said document has a printed region that is suitable for being read by reflection in a first wavelength band, and that is covered by a film overlay that is opaque in the visible spectrum, with the film overlay having a transmission window that includes the said first wavelength band, and by a transparent reflective layer, with the film overlay covering the printed region in an indissociable manner.

The invention also relates to means for marking and securing a product, with the said means consisting of a substrate that has a printed region that is suitable for being read by reflection in a first wavelength band, and that is covered by a film overlay that is opaque in the visible with the film overlay having a transmission window that includes the said first wavelength band, and by a transparent reflective layer that incorporates the diffracting optical marker, for example, by mans of surface stamping, with the film overlay covering the printed region in an indissociable manner.

In accordance with a variant, the means for marking and securing a product consist of a substrate intended to be applied to a printed region, with the substrate being covered by a film overlay that is opaque in the visible spectrum, with the film overlay having a transmission window that includes the said first wavelength band and by a transparent reflective layer that contains the diffracting optical marker.

In accordance with a first variant, the subs consists of a self-adhesive or heat-transferable reflective layer.

In accordance with a second variant, the substrate consists of a narrow band that is suitable for being deposited continuously by being unwound from a spool and being applied, by means of adhesion or a heat-transfer process, to the product to be marked.

In accordance with a third variant, the substrate consists of a filament that is suitable for being inserted into the paper by means of weaving or gluing.

The invention also relates to a device for the verification of a marked product, characterized by the fact that the said device includes illumination means consisting of a plurality of sources that are located in the visible wavelengths and that are inclined along at least two different angles of incidence in relation to the angle that is normal to the substrate.

In accordance with a first variant of the device, the identification information is red by analysis of the light reflected in the wavelength band corresponding to the spectral window of the filter, which is generally the infrared range. The authenticity of the document is verified by a reading of the diffraction pattern formed in the optical complex, and by comparison, by a computer, with a set of reference diffraction patterns.

In accordance with another variant, the device verifies the correlation between the information obtained through a reading of the reflected light and the information that corresponds to the image read under diffracted light

BRIEF DESCRIPTION OF THE DRAWINGS

The invention will be better understood through a reading of the following description, with reference to the accompanying drawings relating to non-limitative examples of embodiments, on which drawings:

FIG. 3 represents a diagrammatic view of a second of an embodiment of a document marked in accordance with the invention;

FIG. 4 represents a cross-sectional view of the optical complex in accordance with this second variant;

DETAILED DESCRIPTION

The procedure in accordance with the invention consists of definitively associating, by means of various embodiments, means that will be referred to hereinbelow as "the identifier" and means referred to hereinbelow as "the authentifier", to form an optical complex that cannot be dissociated without being destroyed.

The identifier is, for example, a bar-code or a series of characters, preferably characters that can be interpreted by an optical character-reading (OCR) system, or even a photograph The identifier makes it possible to implement a number of combinations determined by the type of marking required. The combinations can be determined in such a way as to allow automatic identification by a reader whose general operation is the same as that of the bar-code readers or optical character recognition systems in the prior art, or an infrared camera, in the case of a photographs The authentifier consists of an interference pattern commonly referred to as a "hologram" that forms an indissociable part of the optical complex, which is read by the diffraction of incident light. It can reproduce a non-significant image, or can even include a portion of the information necessary for the identification of the product.

Depending on the variants of the embodiments, the diffraction patterns consist of:

A set of distinct points whose geometric characteristics are defined in relation to the position of the source and in relation to the teoretical position of the document;

A set of distinct lines or bars; or

A set of points that delineate a contour or an image.

The separation of the identifier and the authentifier is ensured by a wavelength-selective film overlay, and by the use of two different wavelength to read each of the two elements. Depending on the variant of the embodiment, the film overlay may be transparent in the visible spectrum or, alternatively, opaque in the visible spectrum and transparent in the infrared.

As an option, each of the elements may carry a portion of the information. In such a case, fill identification is achieved by reading the information that is invisible under reflected light and by reading the information that is visible under diffracted light in a second wavelength band, and/or through verification of the correlation of the information coded by the identifier and the information coded by the authentifier.

Figure 1:
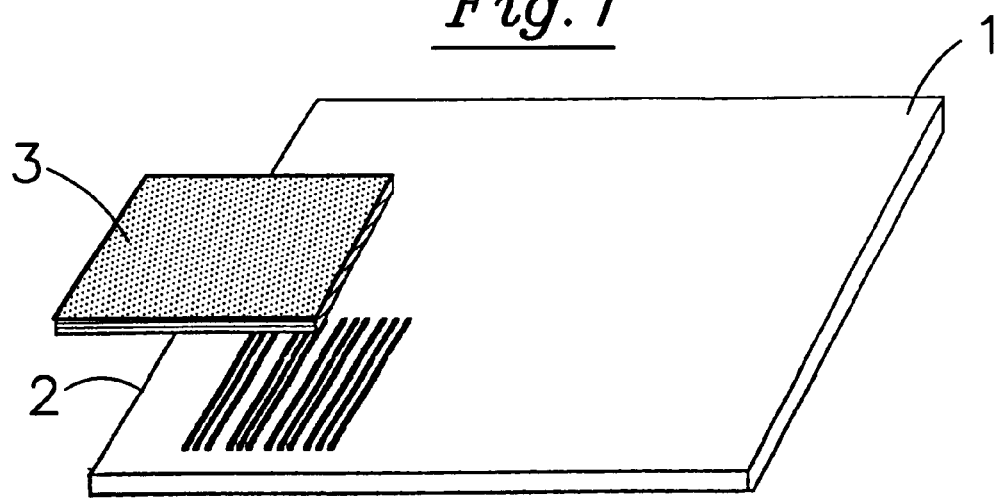
FIG. 1 represents a diagrammatic view of a first variant of an embodiment of a document marked in accordance with the invention.

FIG. 1 represents a view of a first example of an embodiment.

Figure 2:
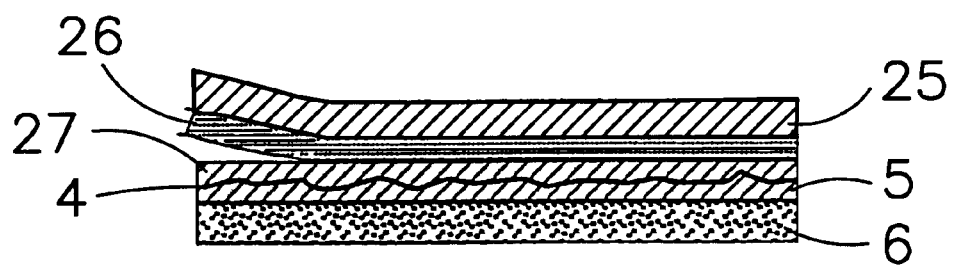
FIG. 2 represents a cross-sectional view of the optical complex in accordance with this first variant.

The product to be marked 1 has a printed region 2 carrying identification bar-codes. This region is covered by a multi-layer assembly 3 consisting of a label that can be affixed in such a way as to form an integral pat of a product by means of gluing or by heat-transfer, for which FIG. 2 represents an enlarged cross-sectional view.

This multi-layer assembly consists of:

A film substrate 25, such as for example a transparent polyester film. This film substrate 25 makes it possible to transfer the optical complex to the document or to the product to be marked and authenticated;

A detachment layer 26 allowing the separation of the film substrate 25 from the active portion of the label;

A protective Mm overlay 27 that is transparent over the entire spectrum;

A stamped transparent reflective layer 4. This layer is rendered reflective by metallization or by the vaporization of an additional layer formed by a dielectric material or even by a film overlay whose index of refraction is different from that of the protective film overlay 27, with this layer carrying the authentification image by deformation of its surface;

A layer of film overlay 5 that is tinted in the visible spectrum, allowing the passage of a narrow pass-band in the invisible spectrum, for example, in the infrared range, with this layer of tinted film overlay 5 being opaque in the visible spectrum;

A layer of adhesive 6 whose characteristics are suited to the substrate, consisting for example of an adhesive that is reactive when heated.

The reflective layer 4 is deformed by stamping, wit the aid of a matrix that includes optical information in the form of micro-relief elements.

A variant consists of providing an irregular detachment layer 26 that has regions with a high level of adhesion and regions with a low level of adhesion. When tractive force is applied to the film substrate 25, the active portions located under the strong adhesive are torn away from the substrate 1, while the active portions located under the weak adhesive remain affixed to the substrate 1 and form a set of spots or a significant assembly that allows the detection of an attempt at counterfeiting by tearing off the authentification label.

FIGS. 3 and 4 represent a variant of the embodiment of the multi-layer assembly 3.

In accordance with this variant, the multi-layer assembly forms a label incorporating the printed region 7 so as to form, for example, a bar-code, The printing is done with a conventional printing ink, or with an ink that is Parent in the visible spectrum and opaque only in the infrared range. The identifier 7 and the authentifier 4 are separated by the layer of film overlay 5 that is opaque in the visible spectrum and transparent in the infrared range.

In both cases, the optical assembly 3 is deposited on the substrate 1 either cold, or by heat-lamination, or by a thermal-transfer process.

Figure 5:
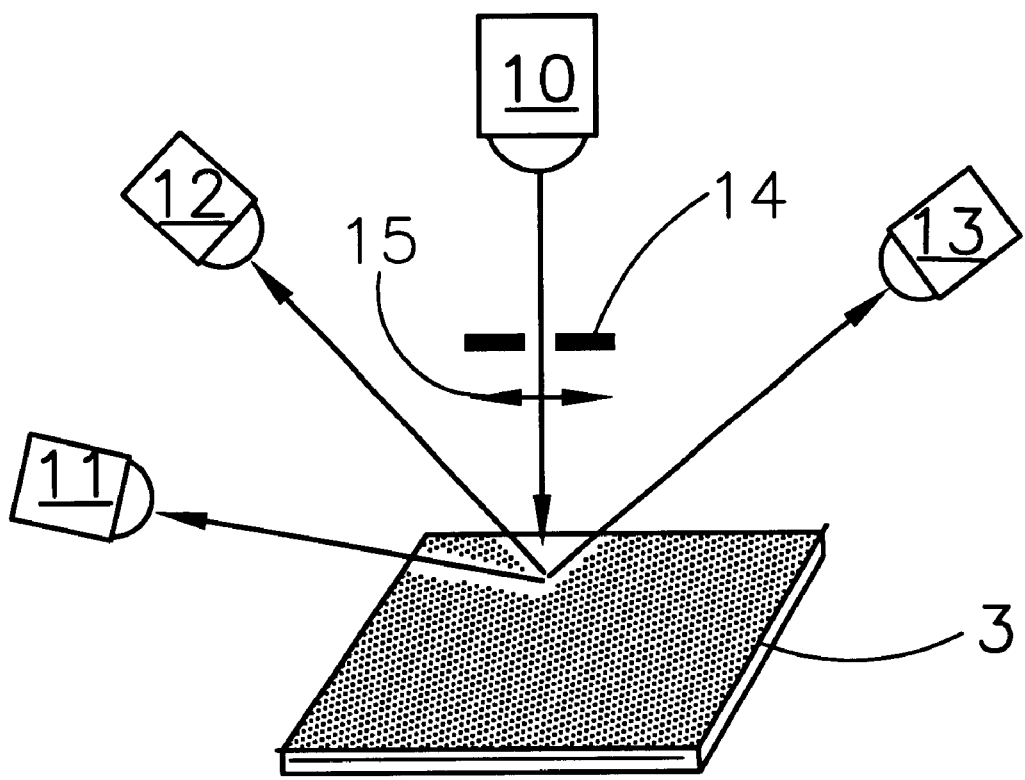
FIGS. 5 through 8 represent diagrammatic views of the reading of the authentifier in accordance with two different configurations.

FIG. 5 represents a diagrammatic view of a device for reading the authentifier, in a variant of an embodiment in accordance with which the diffraction grating recreates an image that corresponds to a set of dots. The techniques for the implementation of a stamped diffraction grating or of a stamped holographic image are known to those skilled in the art, and will not be discussed in detail within the context of the present invention.

The reading device includes alight source, su as for example an electroluminescent (i.e., light-emitting diode 10, that illuminates the optical complex 3 at a determined angle, with the angle of incidence being defined in relation to the angle that is normal to the plane of the diffraction grating. An aperture or pupil 14 and a focusing lens 15 are located along the optical path in order to form a light beam that illuminates the diffraction grating in a point-based manner.

Figure 6:
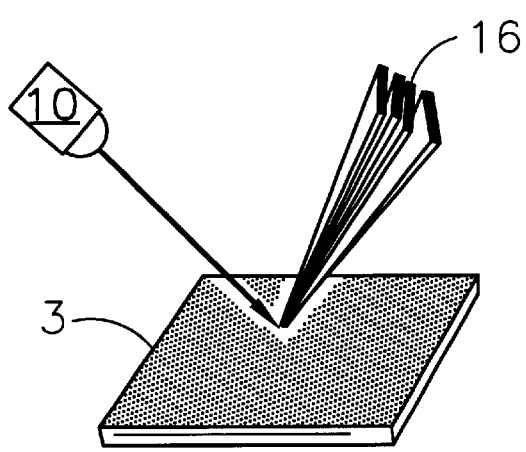
Figure 7:
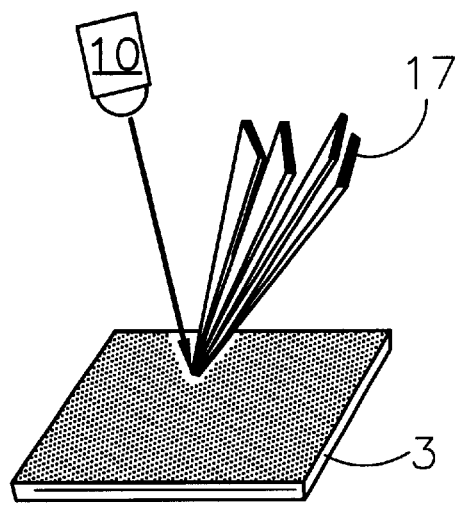

A set of sensors 11 trough 13 detects the light diffracted by the optical-complex grating 3. The correspondence between the detected points of light and the diffraction pattern stored in a computer makes it possible to verify the authenticity of the marked document. As an option, the identifier may be coded in accordance with the information derived from the diffraction pattern, and thus may vary from one document to another depending on a secret coding function stored in the verification equipment in the form of an algorithm for the comparison of the signals from the photo-detectors against the image calculated as a function of the information derived from the identifier and from the said algorithm. FIGS. 6 and 7 represent diagrammatic views of the reading of the authentifier in accordance with two different configurations, in accordance with a variant in which the diffracted pattern corresponds to bar-codes.

FIG. 6 and FIG. 7 represent a diagrammatic view of the result of the illumination of the optical complex 3 by a light source 10 along two different angles of incidence. The particular feature of certain diffraction gratings is that they produce a diffracted pattern that depends on the angle of incidence. Depending on the angle of incidence represented in FIG. 6, or in FIG. 7, the result will correspond to a first bar-code 16 or to a second barcode 17.

Figure 8:
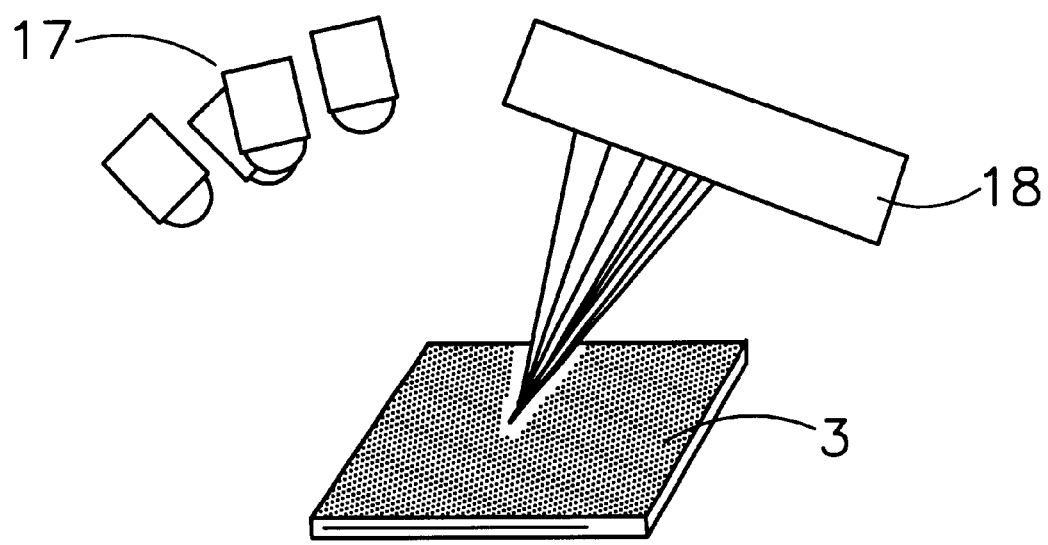

The reading device shown in FIG. 8 includes a bank of electroluminescent diodes 17 that includes a first series of electroluminescent diodes oriented along a first angle of incidence in relation to the angle that is normal to the substrate, for example,+45 degrees in relation to the normal angle, and a second series of electroluminescent diodes oriented along a second, different angle of–45 degrees in relation to the normal angle.

The reading device includes a CCD (charge-coupled device) sensor 18 that detects the diffracted pattern and that generates a signal that can be processed by a microcomputer in order to verify the correspondence between the diffracted pattern and the stored reference pattern or the identifier.

In the example described with reference to FIGS. 6 through 8, the diffracted image corresponds to a bar-code. Of course, any type of grating may be recorded in the optical complex, in order to diffract images that correspond to texts, characters, or graphic information that can be recognized automatically by an optronic (i.e., opto-electronic) device, or by means of visual verification by an operator.

Figure 9:
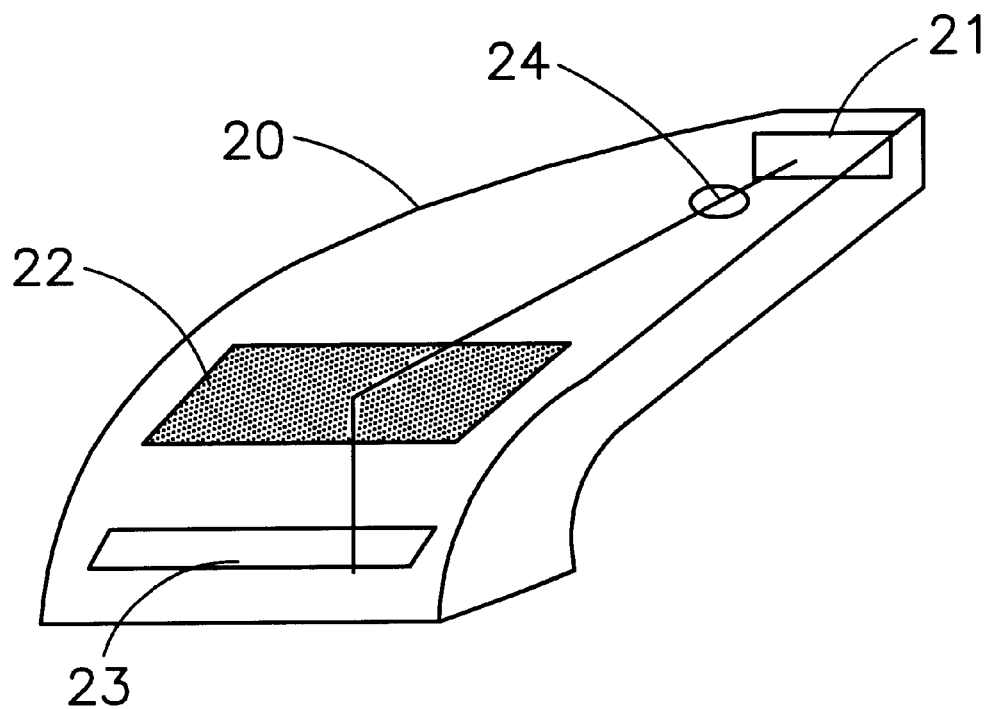
FIG. 9 represents a diagrammatic view of a device for reading the authentifier.

FIG. 9 represents an example of an embodiment of a reader, in the form of a portable device having a housing 20 in the form of a "shower-head", whose rear portion encloses a CCD sensor array 21, and whose forward portion encloses an array 23 consisting of a set of electroluminescent diodes oriented along angles forming angles of +45 and −45 degrees in relation to the normal angle of a window that is open in the lower portion of the housing.

Optical focusing means 24 are provided in order to form, on the CCD transfer bar (i.e., the CCD sensor array) 21, the image diffracted by the diffraction grating placed against the window provided on the lower portion of the housing, after being reflected by a mirror 22.

Another method of implementing a reader for the reading and verification of a document marked with an optical complex of the type described above consists of combining, in a housing, means for recognizing information from the identifier, on the one hand, and means for the verification of the authentifier.

Such a read device includes:

A series of Laser diodes that illuminate the optical complex along one or more angles of incidence;

A CCD matrix or array, or a series of point receivers to analyze the response of the authentifier;

A specific reader for the identifier, functioning in the wavelength band suitable for the identifier, such as for example the infrared;

A computer for the processing of signals, and output interfaces, such as for example a display or an RS-232 output for connection with a peripheral device.

Figure 10:
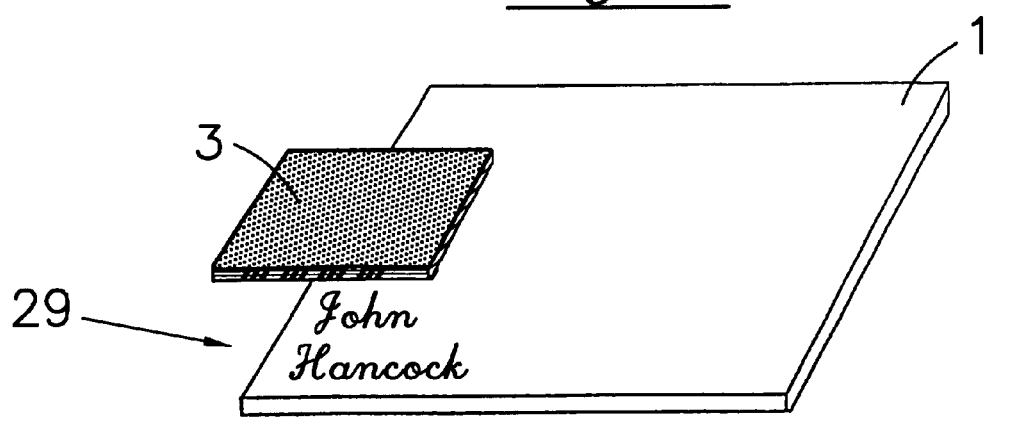
FIGS. 10 and 11 show diagrammatic and cross-sectional views of yet another embodiment of the present invention.
Figure 11:
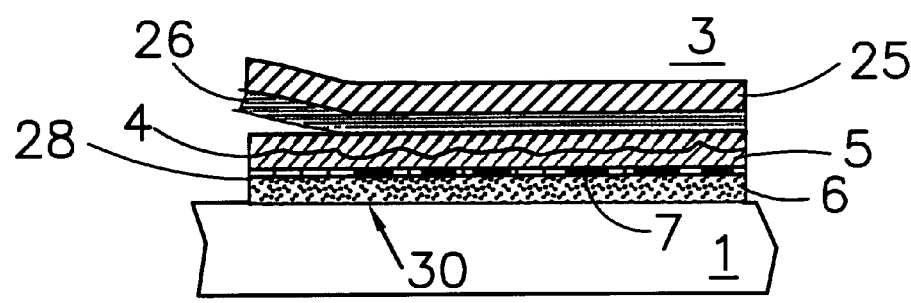

FIGS. 10 and 11 show diagrammatic and cross-sectional views of yet another embodiment of the present invention. As shown in FIG. 10, multi-layer assembly 3 is applied to substrate 1 directly over personalized identifier 29, which in is case is a signature handwritten by the user directly on substrate 1 prior to applying multi-layer assembly 3.

As shown in FIG. 11, multi-layer assembly 3 comprises film substrate 25, active portion 30, and detachment layer 26 between film substrate 25 and active portion 30, wherein detachment layer 26 allows separation of film substrate 25 from active portion 30. Active portion 30 comprises (1) concealing film overlay 5, which is opaque in the visible spectrum and transparent in at least one passband in the invisible spectrum (e.g., infrared), (2) transparent reflective layer 4 below concealing film overlay 5 and forming a diffracting optical marker (e.g., a hologram), and (3) adhesive layer 6 below transparent reflective layer 4. Multi-layer assembly 3 is adapted to be used to customize a product by (i) applying a personalized identifier (e.g., signature 29 in FIG. 10) to the product (e.g., substrate 1); (ii) permanently securing multi-layer assembly 3 over personalized identifier 29 on the product such that adhesive layer 6 adheres to the product and active portion 30 cannot be removed from the product without adversely affecting diffracting optical marker 4; and (iii) separating film substrate 25 from active portion 30, such that the resulting customized product comprises both (A) diffracting optical marker 4 and (B) personalized identifier 29 hidden from view under light in the visible spectrum by concealing film overlay 5, but both diffracting optical marker 4 and personalized identifier 29 being visible under light in the pass-band in the invisible spectrum. As shown in FIG. 11, multi-layer assembly 3 may also have a further identifier 7 (e.g., a bar code) as part of a layer 28 located between diffracting optical marker 4 and adhesive layer 6.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures.

The description of the invention in the foregoing text has been provided as a non-limitative example. It should be clearly understood that those skilled in the art will be capable of implementing different variants without departing from the scope of the invention in so doing.

What is claimed is:

1. A multi-layer assembly for customizing a product, comprising:
   (a) a film substrate;
   (b) an active portion; and
   (c) a detachment layer between the film substrate and the active portion, wherein the detachment layer allows separation of the film substrate from the active portion wherein the active portion comprises:
      (1) a concealing film having an upper portion that is opaque in the visible spectrum and transparent in at least one passband in the invisible spectrum and a lower portion;
      (2) a transparent reflective layer positioned between the concealing film upper and lower portions and forming a diffracting optical marker; and
      (3) an adhesive layer adjacent the concealing film lower portion, wherein:
         the multi-layer assembly forms a strip on a spool, the strip suitable for being unwound from the spool and continuously deposited on the product; and wherein
         the multi-layer assembly is adapted to be used to customize a product by:
            (i) applying a personalized identifier to the product;
            (ii) unwinding the strip of the multi-layer assembly from the spool;
            (iii) permanently securing the multi-layer assembly over the personalized identifier on the product such that the adhesive layer adheres to the product and the active portion cannot be removed from the product without adversely affecting the diffracting optical marker; and
            (iv) separating the film substrate from the active portion, such that the resulting customized product comprises both the diffracting optical marker and the personalized identifier hidden from view under light in the visible spectrum by the concealing film overlay, but both the diffracting optical marker and the personalized identifier being visible under light in the passband in the invisible spectrum.

2. The multi-layer assembly of claim 1, wherein:
   the film substrate is a transparent polyester film;
   the product is a document;
   the personalized identifier corresponds to a user's handwritten signature;
   the multi-layer assembly is secured to the product either cold, by heat lamination, or by a thermal-transfer process;
   the passband in the invisible spectrum is in the infrared spectrum; and
   the diffracting optical marker is a hologram.

3. The multi-layer assembly of claim 1, wherein ink used to generate the personalized identifier is transparent in the visible spectrum and opaque in the passband of the invisible spectrum.

4. The multi-layer assembly of claim 1, further comprising a layer containing an identifier positioned between the concealing film lower portion and the adhesive layer.

5. A method for customizing a product, comprising the steps of:
  (i) providing a multi-layer assembly comprising:
    (a) a film substrate;
    (b) an active portion; and
    (c) a detachment layer between the film substrate and the active portion, wherein the detachment layer includes regions of differing levels of adhesion and allows separation of the film substrate from the active portion, such that, when the film substrate is removed from the active portion, a first plurality of regions of the active portion are torn away and a second plurality of regions of the active portion remain affixed depending on the level of adhesion, the removal of the film substrate forming a specific pattern in the active portion, wherein the active portion comprises:
      (1) a concealing film overlay that is opaque in the visible spectrum and transparent in at least one passband in the invisible spectrum;
      (2) a transparent reflective layer below the concealing film overlay and forming a diffracting optical marker; and
      (3) an adhesive layer below the transparent reflective layer;
  (ii) applying a personalized identifier to the product;
  (iii) permanently securing the multi-layer assembly over the personalized identifier on the product such that the adhesive layer adheres to the product and the active portion cannot be removed from the product without adversely affecting the diffracting optical marker; and
  (iv) separating the film substrate from the active portion, such that the resulting customized product comprises the second plurality of regions of the active portion, the diffracting optical marker and the personalized identifier hidden from view under light in the visible spectrum by the concealing film overlay, but both the diffracting optical marker and the personalized identifier being visible under light in the pass-band in the invisible spectrum.

6. The method of claim 5, wherein:
the film substrate is a transparent polyester film;
the product is a document;
the personalized identifier corresponds to a user's handwritten signature;
the multi-layer assembly is secured to the product either cold, by heat lamination, or by a thermal-transfer process;
the passband in the invisible spectrum is in the infrared spectrum; and
the diffracting optical marker is a hologram.

7. A customized product generated using the method of claim 6.

8. The method of claim 5, wherein ink used to generate the personalized identifier is transparent in the visible spectrum and opaque in the passband of the invisible spectrum.

9. A customized product generated using the method of claim 8.

10. The method of claim 5, wherein the multi-layer assembly is part of a strip that is suitable for being deposited continuously by being unwound from a spool and being applied to the product to be customized.

11. A customized product generated using the method of claim 10.

12. A customized product generated using the method of claim 5.

13. A multi-layer assembly for customizing a product, comprising:
  (a) a film substrate;
  (b) an active portion; and
  (c) a detachment layer between the film substrate and the active portion, wherein the detachment layer includes regions of differing levels of adhesion and allows separation of the film substrate from the active portion, such that, when the film substrate is removed from the active portion, a first plurality of regions of the active portion are torn away and a second plurality of regions of the active portion remain affixed depending on the level of adhesion, the removal of the film substrate forming a specific pattern in the active portion, wherein the active portion comprises:
    (1) a concealing film overlay that is opaque in the visible spectrum and transparent in at least one passband in the invisible spectrum;
    (2) a transparent reflective layer below the concealing film overlay and forming a diffracting optical marker; and
    (3) an adhesive layer below the transparent reflective layer, wherein: the multi-layer assembly is adapted to be used to customize a product by:
      (i) applying a personalized identifier to the product;
      (ii) permanently securing the multi-layer assembly over the personalized identifier on the product such that the adhesive layer adheres to the product and the active portion cannot be removed from the product without adversely affecting the diffracting optical marker; and
      (iii) separating the film substrate from the active portion, such that the resulting customized product comprises the second plurality of regions of the active portion, the diffracting optical marker and the personalized identifier hidden from view under light in the visible spectrum by the concealing film overlay, but being visible under light in the passband in the invisible spectrum.

14. The multi-layer assembly of claim 13, wherein:
the film substrate is a transparent polyester film;
the product is a document;
the personalized identifier corresponds to a user's handwritten signature;
the multi-layer assembly is secured to the product either cold, by heat lamination, or by a thermal-transfer process;
the passband in the invisible spectrum is in the infrared spectrum; and
the diffracting optical marker is a hologram.

15. The multi-layer assembly of claim 13, wherein ink used to generate the personalized identifier is transparent in the visible spectrum and opaque in the passband of the invisible spectrum.

16. The multi-layer assembly of claim 13, wherein the multi-layer assembly is part of a strip that is suitable for being deposited continuously by being unwound from a spool and being applied to the product to be customized.

17. A multi-layer assembly for customizing a product, comprising:
  (a) a film substrate;
  (b) an active portion; and
  (c) a detachment layer between the film substrate and the active portion, wherein the detachment layer allows separation of the film substrate from the active portion, wherein the active portion comprises:

(1) a concealing film having an upper portion that is opaque in the visible spectrum and transparent in at least one passband in the invisible spectrum and a lower portion;
(2) a transparent reflective layer positioned between the concealing film upper and lower portions and forming a diffracting optical marker; and
(3) an adhesive layer adjacent the concealing film lower portion.

18. The multi-layer assembly of claim 17, further comprising a layer containing an identifier positioned between the concealing film lower portion and the adhesive layer.

* * * * *